United States Patent
Gregorovich et al.

(10) Patent No.: US 6,268,456 B1
(45) Date of Patent: *Jul. 31, 2001

(54) COATING COMPOSITION CONTAINING SILANE FUNCTIONALITY

(75) Inventors: Basil V. Gregorovich, Wilmington, DE (US); Isidor Hazan, Clementon, NJ (US); Robert Rudolph Matheson; Lech Wilczek, both of Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 08/973,383

(22) PCT Filed: Jun. 4, 1996

(86) PCT No.: PCT/US96/08597

§ 371 Date: Dec. 3, 1997

§ 102(e) Date: Dec. 3, 1997

(87) PCT Pub. No.: WO96/39468

PCT Pub. Date: Dec. 12, 1996

Related U.S. Application Data

(63) Continuation of application No. 08/464,916, filed on Jun. 5, 1995, now abandoned.

(51) Int. Cl.[7] .................................................. C08G 77/60
(52) U.S. Cl. ............................ 528/35; 525/100; 525/101; 525/102; 556/420; 556/421; 556/434; 556/431
(58) Field of Search ........................ 556/420, 421, 556/434, 431; 525/102, 101, 100; 528/35

(56) References Cited

U.S. PATENT DOCUMENTS

| | | | |
|---|---|---|---|
| 4,284,548 | * 8/1981 | Kaufman et al. | 525/102 |
| 4,389,432 | * 6/1983 | Inoue et al. | 427/299 |
| 4,623,740 | 11/1986 | Deschler et al. | 556/417 |
| 4,965,334 | * 10/1990 | Mohr et al. | 528/34 |
| 4,975,488 | * 12/1990 | Furukawa et al. | 525/100 |
| 5,063,114 | 11/1991 | Nambu et al. | 428/447 |
| 5,066,698 | 11/1991 | Hazan et al. | 524/269 |
| 5,244,696 | 9/1993 | Hazan et al. | 427/402 |
| 5,244,959 | 9/1993 | Hazan et al. | 524/504 |
| 5,250,605 | * 10/1993 | Hazan et al. | 524/504 |
| 5,252,660 | 10/1993 | Hazan et al. | 524/504 |
| 5,281,636 | 1/1994 | Nambu et al. | 524/378 |
| 5,344,879 | * 9/1994 | Inoue et al. | 525/100 |
| 5,344,880 | 9/1994 | Nambu et al. | 525/100 |
| 5,359,005 | 10/1994 | Kania et al. | 525/203 |
| 5,371,261 | * 12/1994 | Wang et al. | 556/421 |
| 5,399,607 | 3/1995 | Nanbu et al. | 524/385 |
| 5,719,251 | * 2/1998 | Wilczek et al. | 528/35 |
| 5,753,737 | * 5/1998 | Matsumura et al. | 524/315 |

FOREIGN PATENT DOCUMENTS

| | | | |
|---|---|---|---|
| 0 169 992 | 2/1986 | (EP) | C07F/7/10 |
| 0 307 954 | 9/1988 | (EP) | C08L/57/06 |
| 427 293 | * 5/1991 | (EP) | . |
| 0 427 293 | 5/1991 | (EP) | C09D/157/08 |
| 0 497 231 | 8/1992 | (EP) | C08L/57/06 |
| 0 507 727 | 10/1992 | (EP) | C07F/7/18 |
| WO 92/11328 | 7/1992 | (WO) | C09D/143/04 |
| 94/06807 | * 3/1994 | (WO) | . |
| WO 94/06807 | 3/1994 | (WO) | C07F/7/18 |
| WO 94/09013 | 4/1994 | (WO) | C07F/7/10 |
| WO 96/27599 | 9/1996 | (WO) | C07F/7/12 |

* cited by examiner

Primary Examiner—Margaret G. Moore
(74) Attorney, Agent, or Firm—James A. Costello; Sudhir G. Deshmukh

(57) ABSTRACT

A sprayable coating composition that contains at least one soluble film-forming silicon-containing compound having, on average, more than one fuctionalized silicon group, a volatile organic carrier, a polymer microparticle component, and a catalyst; a substrate coated with the composition; a process for coating the substrate to provide a protective finish; the finish-protected substrate; certain oligomeric compounds and a process therefor.

3 Claims, No Drawings

COATING COMPOSITION CONTAINING SILANE FUNCTIONALITY

This application claims priority to PCT 96/08597, which is a continuation of Ser. No. 08/464,916, filed Jun. 5, 1995, now abandoned.

BACKGROUND OF THE INVENTION

1. Field of the Invention

This invention is directed to a coating composition useful for providing a finish on a variety of substrates. In particular, this invention is directed to an organosilane composition useful for finishing automobiles and trucks.

2. State of the Art

It is well-known that consumers prefer automobiles and trucks with an exterior finish having an attractive aesthetic appearance including high gloss and excellent DOI (distinctness of image). While ever more aesthetically attractive finishes have been obtained, deterioration of the finish over time, whereby the exterior finish of an automobile or truck loses its luster or other aspects of its aesthetic appearance, is all the more noticeable. An increasingly observed cause of this deterioration is etching of the finish caused by exposure to environmental chemical attack. Chemicals that can cause etching of a finish include acid rain and chemical smog.

In order to protect and preserve the aesthetic qualities of the finish on a vehicle, it is generally known to provide a clear (unpigmented) topcoat over a colored (pigmented) basecoat, so that the basecoat remains unaffected even on prolonged exposure to the environment or weathering. It is also generally known that alkoxysilane polymers, due to strong siloxane bonding when cured, exhibit excellent chemical resistance. Exemplary of prior art literature disclosing silane polymers for coating are U.S. Pat. Nos. 5,244,696 and 5,223,495.

There is a continuing need for a commercially practical clearcoat finish having excellent appearance, including high gloss and DOI, that is also resistant to etching caused by chemical attack. To be commercially practical, such a clearcoat must not be prone to cracking. It is also important that the finish have good scratch and mar resistance and be derived from compositions that are characterized by low levels of volatile organic chemicals such as solvents and the like. Finally, such a clearcoat should be capable of application over a variety of basecoats and have excellent adhesion.

SUMMARY OF THE INVENTION

This invention concerns a sprayable, curable, liquid coating composition comprising:

i) at least one film-forming reactive silyl group-containing compound having at least two functional groups of the formula, —SiR$_n$X$_{3-n}$, the functional groups being attached to the compound by a silicon-carbon bond, wherein:

n is 0, 1 or 2;

R is oxysilyl or unsubstituted hydrocarbyl or hydrocarbyl substituted with at least one Asubstituent containing a member selected from the group O, N, S, P, Si; and X is a hydrolyzable moiety selected from the group C$_1$ to C$_4$ alkoxy, C$_6$ to C$_{20}$ aryloxy, C$_1$ to C$_6$ acyloxy, hydrogen, halogen, amine, amide, imidazole, oxazolidinone, urea, carbamate, and hydroxylamine;

the compound having a number average molecular weight between about 300 and 3000 and volatility such that no more than about 30 parts by weight of silyl group-containing compound per 100 parts of the compound evaporate during cure;

ii) an optional second film-forming reactive silyl group-containing component which, together with i, produces an average —SiR$_n$X$_{3-n}$ functionality of more than one, iii) polymer microparticles, substantially insoluble in the liquid coating composition, in an amount of 5 to 100 parts per 100 parts by weight of all other film-forming components; and iv) from 0 to about 100 parts by weight of a liquid organic carrier, based on weight of i, ii, and iii; and v) sufficient catalyst to effect crosslinking.

The present invention is also directed to a process for making a film-forming reactive silyl group-containing oligomeric compound comprising the steps:

i) reacting a silane selected from the group disilylated limonene and disilylated vinylnorbornene with a controlled amount of water in the presence of a catalyst, ii) stripping methanol from the reaction product of (i) to complete the oligomerization, and iii) optionally removing (a) insoluble byproducts of step (ii) and (b) inert solvent employed to facilitate removal of insoluble byproducts;

whereby the reactive compound that is formed has at least 4 silyl groups.

The term "compound" as employed herein excludes all polymers of random chain lengths such as obtained in free-radical initiated vinyl polymerization. The term "component" in item (ii) includes polymers, oligomers, compounds and mixtures thereof. The average number of silyl groups in the composition, when (i) and (ii) are both present, will always be more than one.

The invention also includes a process for coating a substrate with the above coating composition. The invention further includes certain oligomeric compounds (i), (see Examples A and B); a process for making the oligomer, (see Examples C and D); and a substrate having adhered thereto a coating derived from the described composition.

The composition of the invention is especially useful for forming a clear topcoat over a pigmented basecoat. Such a clear topcoat can be applied over a variety of colorcoats, such as water or organic solvent based colorcoats or powder colorcoats.

DETAILS OF THE INVENTION

The Silyl-Containing Compound (i)

Compound (i) is selected from at least one of the following groups 1 to 12.

1.) Amino-functional silanes reacted with isocyanate.

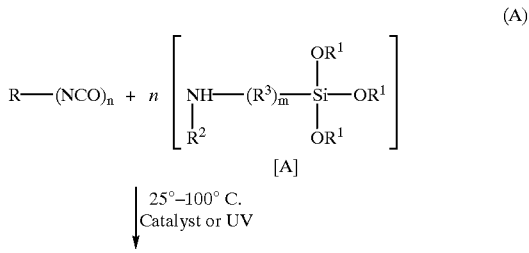

(A)

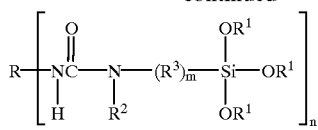

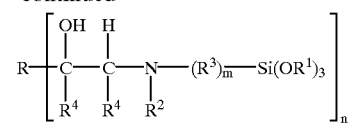

wherein:

R is a moiety independently selected from the group consisting of alkylene, cycloalkylene, heterocyclic, arylene, alkoxylene, aralkylene, alkenylene, cycloalkylene and low molecular weight polymer moiety;

$R^1$ is independently $C_1$–$C_{16}$ alkyl;

$R^2$ is independently H or $C_1$–$C_{12}$ alkyl;

$R^3$ is a moiety independently selected from the group consisting of alkylene, cycloalkylene, heterocyclic, arylene, alkoxylene, aralkylene, alkenylene, cycloalkylene and low molecular weight polymer moiety;

n is an integer of 2 to 12; and m is 1 to 16.

Representative low molecular weight polymer values for R and $R^3$ are polyester, polyurethane, polyether, polyamine and the like. Preferred for $R^1$ are alkyls of $C_1$ to $C_4$, most preferably $C_1$ to $C_2$. Alkyl substituents can be linear or cyclic and the amine function can be primary or secondary. By "low molecular weight" is meant no more than about 3000 (number average). When R and/or $R^3$ are low molecular weight polymers, m=1.

Hereafter, in groups 2 to 10, R, $R^1$, $R^2$, $R^3$, n and m are as defined above except where indicated. The following reactions need not go to completion provided the product contains at least two silyl groups.

2.) Amino-functional silane reacted with anhydride.

(B)

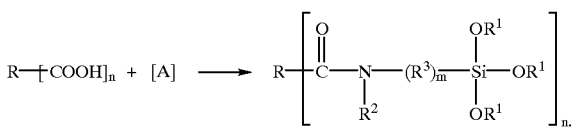

Both R groups can be taken together and when taken together a ring structure of $C_3$–$C_{12}$ cycloalkyl is formed.

3.) Amino-functional silane reacted with an epoxide.

(C)

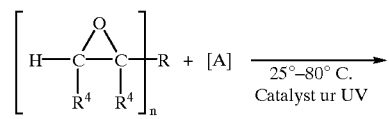

$R^4$ is independently selected from H and $C_1$–$C_{12}$ alkyl; or $R^4$ can be taken together to form a $C_3$–$C_{12}$ cycloalkyl.

4.) Amino-functional silane reacted with acid.

(D)

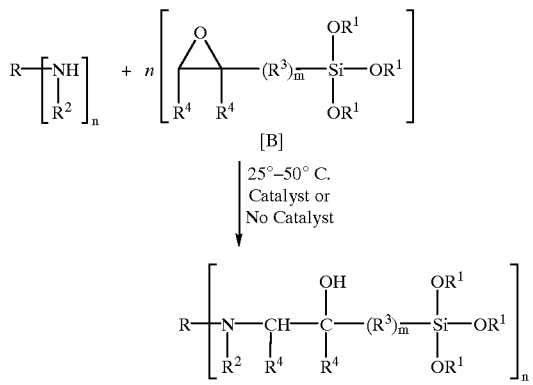

5.) Epoxy-functional silane reacted with amine.

(E)

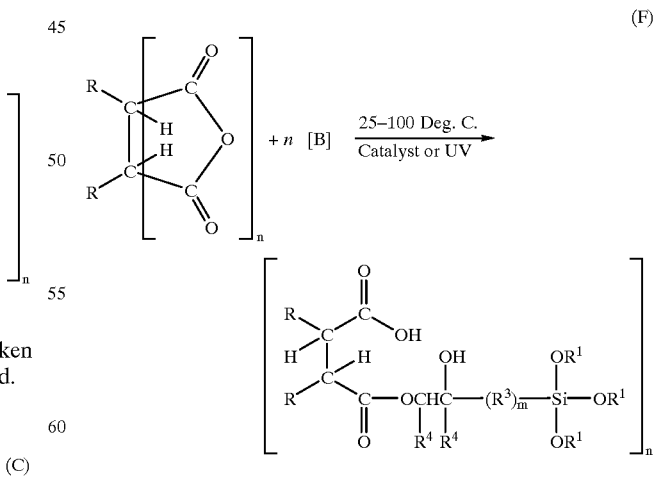

wherein $R^2$ is H, then n is 1–12.

6.) Epoxy-functional silane reacted with anhydride.

(F)

wherein R can be taken together as defined in group 2 above. The acid group can be further reacted at 100°–150° C. with catalyst to have disubstitution at each anhydride, in which case n is 1 to 12.

7.) Epoxy-functional silane reacted with acid.

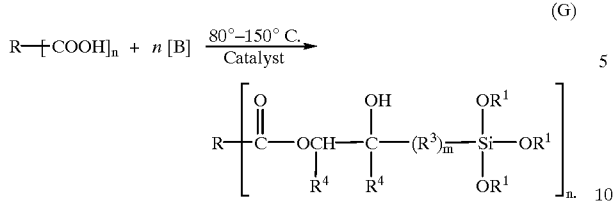

8.) Reaction of [A]+n [B].

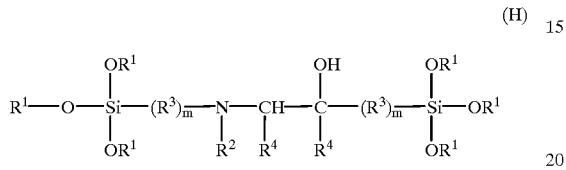

n is 1 or 2; n is 2 when $R^2$ is H.

9.) Isocyanate-containing alkoxysilanes reacted with a polyol.

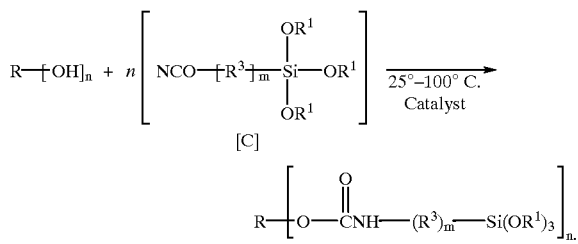

10.) Reaction of [A]+n[C].

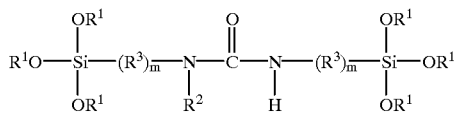

n is 1 or 2; n is 2 when $R^2$ is H.

With respect to Group 9 Compounds, one mole of 1,4-cyclohexanedimethanol can be reacted with 2 moles of isocyanatopropyltrimethoxysilane to give a silane compound having two trimethoxysilyl groups per molecule. Alternatively, one mole of pentaerythritol can be reacted with 3 moles of methylhexahydrophthalic anhydride to give a carboxylic acid compound having 3 carboxylic acid groups and 1 hydroxyl group. The carboxylic acid compound can then be reacted with 3 moles of the glycidyl ester of a 10-carbon, branched, aliphatic carboxylic acid to give a polyol compound having 4 hydroxyl groups. The polyol compound can then be reacted with 3 moles of isocyanatopropyltrimethoxysilane to give a silane compound having 1 hydroxyl group and 3 trimethoxysilyl groups.

11.) Another method for making the silane compounds is to react a compound having two or more carbon-carbon double bonds with trichlorosilane in the presence of a catalyst and then treating the resulting adduct with an alcohol. Useful compounds have the formula:

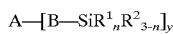

wherein:
A is an aliphatic, cycloaliphatic or benzene radical, with y free valencies, each of which free valencies is to a different carbon atom of the carbocyclic ring formed by A;

each B is independently a covalent bond, an alkylene group, or a substituted alkylene group having either one or more ether oxygens (as in —$OR^3$—) and/or ester groups (as in —C(O)$OR^3$— or —O(O)$CR^3$—) wherein the ether oxygens are between alkylene segments and wherein the ester groups are between A and $R^3$ or between an alkylene segment and $R^3$, wherein said alkylene group and said substituted alkylene group, which is comprised of said alkylene segments, are independently defined as having 1 to 20 carbon atoms, preferably 1 to 10, and most preferably 1 to 5 carbon atoms;

y is 2, 3, 4, 5 or 6;

each $R^1$ attached to the silicon atom is independently alkyl containing 1 to 20 carbon atoms or phenyl;

each $R^2$ attached to the silicon atom is independently halogen, alkoxy containing 1 to 20 carbon atoms, phenoxy, acyloxy containing 1 to 20 carbon atoms, or oxysilyl;

each $R^3$ is independently an alkylene group containing 2 to 20 carbon atoms; and each n is independently 0, 1 or 2.

For example, one mole of 5-vinyl-2-norbornene can be reacted with 2 moles of trichlorosilane and the resulting compound can be reacted with 6 moles of methanol to replace the chlorine atoms with methoxy groups. The resulting silane compound will have two trimethoxysilyl groups. Alternatively, one mole of limonene can be reacted with 2 moles of trichlorosilane and the resulting compound can be reacted with 6 moles of methanol to replace the chlorine atoms with methoxy groups. The resulting silane compound will have two trimethoxysilyl groups. Alternatively, one mole of trivinylcyclohexane can be reacted with 3 moles of trichlorosilane and the resulting compound can be reacted with 9 moles of methanol to replace the chlorine atoms with methoxy groups. The resulting silane compound will have three trimethoxysilyl groups.

Other useful compounds for this hydrosilylation reaction include terpenes like myrcene, ocimene, alloocimene, dipentene, menthadiene, phellandrene, terpinene, terpinolene, isoterpinolene, pinenes, and also 4-vinyl-1-cyclohexene, dicyclopentadiene, cyclododecatriene, norbornadiene, and their isomers.

12.) Another contemplated method for making compound (i) is to react an unsaturated alcohol with an acid or anhydride to produce an unsaturated ester. This ester is hydrosilylated to form an adduct which is then treated with alcohol. Alternatively, the process can be initiated with an unsaturated acid or ester transesterified with an alcohol, the polyfunctionality can be supplied by one or more of the acid, anhydride, ester, or alcohol reactants.

It is contemplated that the definition of compound (i) employed herein also includes oligomers formed from precursors B or C, independently, through their organofunctionality (epoxide or isocyanate).

Optional Silyl Group-Containing Component (ii)

The coating composition of this invention can include a number of ingredients to enhance preparation of the composition as well as to improve final properties of the coating composition and the finish. For example, it is often desirable to include about 20 to 90%, preferably 20 to 60%, by weight of the composition, of a film-forming reactive silane polymer. Such polymer typically has a number average molecular weight of about 500 to 10,000.

The silane polymer is the polymerization product of about 30–95%, preferably 40–60%, by weight of ethylenically unsaturated nonsilane containing monomers and about 5–70%, preferably 40–60%, by weight of ethylenically unsaturated silane-containing monomers, based on the weight of the organosilane polymer. Suitable ethylenically unsaturated nonsilane containing monomers are alkyl acrylates, alkyl methacrylates and mixtures thereof, where the alkyl groups have 1–12 carbon atoms, preferably 3–8 carbon atoms.

The film-forming component of the coating composition is referred to as the "binder" and is dissolved, emulsified or otherwise dispersed in an organic solvent or liquid carrier. The binder generally includes all the components that contribute to the solid organic portion of the cured composition. Generally, pigments, and chemical additives such as stabilizers are not considered part of the binder. Non-binder solids other than pigments typically do not exceed about 5% by weight of the composition. The term "binder" includes the reactive silane compound, the organosilane polymer, the dispersed polymer, and all other optional film-forming components. The coating composition contains bout 50–100% by weight of the binder and about 0–50% y weight of the organic solvent carrier.

Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, such as trimethylcyclohlexyl methacrylate, trimethylcyclohexyl acrylate, iso-butyl cyclohexyl methacrylate, t-butyl cyclohexyl acrylate, and t-butyl cyclohexyl methacrylate. Aryl acrylate and aryl methacrylates also can be used, such as benzyl acrylate and benzyl methacrylate. Mixtures of two or more of the above-mentioned monomers are also suitable.

In addition to alkyl acrylates and methacrylates, other polymerizable nonsilane-containing monomers, up to about 50% by weight of the polymer, can be used in the acrylosilane polymer for the purpose of achieving the desired properties such as hardness; appearance; mar, etch and scratch resistance, and the like. Exemplary of such other monomers are styrene, methyl styrene, acrylamide, acrylonitrile, methacrylonitrile, and the like.

A silane-containing monomer useful in forming the acrylosilane polymer is an alkoxysilane having the following structural formula:

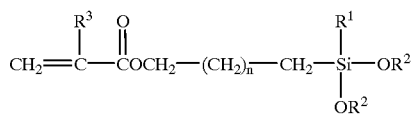

wherein R is either $CH_3$, $CH_3CH_2$, $CH_3O$, or $CH_3CH_2O$; $R^1$ and $R^2$ are $CH_3$ or $CH_3CH_2$; and $R^3$ is either H. $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acryloxy alkyl silanes, such as gamma-acryloxypropyl-trimethoxysilane and the methacryloxy alkyl silanes, such as gamma-methacryloxypropyltrimethoxysilane, and gamma-methacryloxypropyltris(2-methoxyethoxy)silane.

Other suitable alkoxysilane monomers have the following structural formula:

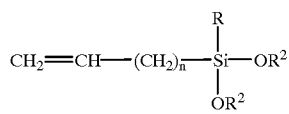

wherein R, $R^1$ and $R^2$ are as described above and n is 0 or a positive integer from 1 to 10. Examples of such alkoxysilanes are the vinylalkoxysilanes, such as vinyltrimethoxysilane, vinyltriethoxysilane and vinyltris(2-methoxyethoxy)silane. Other examples of such alkoxysilanes are the allylalkoxysilanes such as allyltrimethoxysilane and allyltriethoxysilane.

Other suitable silane-containing monomers are acyloxysilanes, including acryloxysilane, methacryloxysilane and vinylacetoxysilanes, such as vinylmethyldiacetoxysilane, acryloxypropyltriacetoxysilane, and methacryloxypropyltriacetoxysilane. Of course, mixtures of the silane-containing monomers are also suitable.

Silane functional macromonomers also can be used in forming the silane polymer. These macromonomers are the reaction product of a silane-containing compound, having a reactive group such as epoxide or isocyanate, with an ethylenically unsaturated non-silane-containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–8 carbon atoms in the alkyl group and an isocyanatoalkyl alkoxysilane such as isocyanatopropyltriethoxysilane.

Typical of such silane-functional macromonomers are those having the following structural formula:

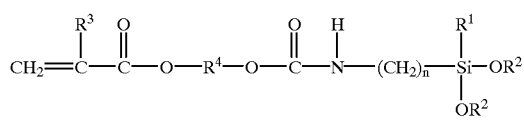

wherein R, $R^1$, and $R^2$ are as described above; $R^4$ is H or $CH_3$, $R^5$ is an alkylene group having 1–8 carbon atoms and n is a positive integer from 1–8.

In addition to the organosilane polymer, other film-forming and/or crosslinking solution polymers can be included in the composition of the present application. Examples are acrylics, cellulosics, aminoplasts, urethanes, polyesters, epoxides or mixtures thereof. One preferred optional film-forming polymer is a polyol, for example, an acrylic polyol solution polymer of polymerized monomers. Such monomers can include any of the aforementioned alkyl acrylates and/or methacrylates and, in addition, hydroxy alkyl acrylates or methacrylates. The polyol polymer preferably has a hydroxyl number of about 50–200 and a weight average molecular weight of about 1,000–200,000 and preferably about 1,000–20,000.

To provide the hydroxy functionality in the polyol, up to about 90% by weight, preferably 20 to 50%, of the polyol comprises hydroxy functional polymerized monomers. Suitable monomers include hydroxyalkyl acrylates and methacrylates, for example, hydroxyethyl acrylate, hydroxypropyl acrylate, hydroxyisopropyl acrylate, hydroxybutyl acrylate, hydroxyethyl methacrylate, hydroxypropyl methacrylate, hydroxyisopropyl methacrylate, hydroxybutyl methacrylate, and the like, and mixtures thereof.

Other polymerizable monomers can be included in the polyol polymer, in an amount up to about 50% by weight. Such polymerizable monomers include, for example, styrene, methylstyrene, acrylamide, acrylonitrile, methacrylonitrile, methacrylamide, methylol methacrylamide, methylol acrylamide and the like, and mixtures thereof.

In addition to the silane-forming polymer (ii) described heretofore, the reactive component (ii) can also be a monofunctional silane or silane-containing oligomer that is outside the definition of compound (i).

The Polymer Microparticles (iii)

This component of the coating composition of the invention is a polymer dispersed in an organic (substantially nonaqueous) medium. This component has been described heretofore as a nonaqueous dispersion (NAD) polymer, a microgel, a nonaqueous latex, or a polymer colloid. In general, the dispersed polymer is stabilized by steric stabilization accomplished by the attachment of a solvated polymeric or oligomeric layer at the particle medium interface.

In the dispersed polymers of the present composition, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymers solve the problem of cracking and are used in an amount varying from about 10 to 60% by weight, preferably about 15 to 40%, more preferably about 20 to 30%, of the total binder in the composition. The ratio of the silane compound to the dispersed polymer component of the composition suitably ranges from 5:1 to 1:2, preferably 4:1 to 1:1. To accommodate these relatively high concentrations of dispersed polymers, it is desirable to have reactive groups on the arms of the dispersed polymer, which reactive groups make the polymers compatible with the continuous phase of the system.

The dispersed polymer contains about 10–90%, preferably 50–80%, by weight, based on the weight of the dispersed polymer, of a high molecular weight core having a weight average molecular weight of about 50,000–500,000. The preferred average particle size is 0.05 to 0.5 microns. The arms, attached to the core, make up about 10–90%, preferably 20–59%, by weight of the dispersed polymer, and have a weight average molecular weight of about 1,000–30,000, preferably 1,000 to 10,000.

The macromolecular core of the dispersed polymer typically comprises polymerized ethylenically unsaturated monomers. Suitable monomers include styrene, alkyl acrylate or methacrylate, ethylenically unsaturated monocarboxylic acid, and/or silane-containing monomomers. Such monomers as methyl methacrylate contribute to high Tg (glass transition temperature) whereas such monomers as butyl acrylate or 2-ethylhexyl acrylate contribute to low Tg. Other optional monomers are hydroxyalkyl acrylates, methacrylates or acrylonitrile. Such functional groups as hydroxy in the core can react with silane groups in the silane compound to produce additional bonding within the film matrix. If a crosslinked core is desired, allyl diacrylate or allyl methacrylate can be used. Alternatively, an epoxy functional monomer such as glycidyl acrylate or methacrylate can be used to react with monocarboxylic acid-functional comonomers and crosslink the core; or the core can contain silane functionality.

A preferred feature of the dispersed polymers is the presence of macromonomer arms which contain hydroxy groups adapted to react with the organosilane compound. It is not known with certainty what portion of these hydroxy functional groups react with the organosilane compound because of the numerous and complicated sets of reactions that occur during baking and curing. However, it can be said that a substantial portion of these functionalities in the arms, preferably the majority thereof, do react and crosslink with the film-former of the composition, which in some cases can exclusively consist of an organosilane compound.

The arms of the dispersed polymer should be anchored securely to the macromolecular core. For this reason, the arms preferably are anchored by covalent bonds. The anchoring must be sufficient to hold the arms to the dispersed polymer after they react with the film-former compound. For this reason, the conventional method of anchoring by adsorption of the backbone portion of a graft polymer may be insufficient.

The arms or macromonomers of the dispersed polymer serve to prevent the core from flocculating by forming a steric barrier. The arms, typically in contrast to the macromolecular core, are believed capable, at least temporarily, of being solvated in the organic solvent carrier or media of the composition. They can be in chain-extended configuration with their hydroxy functional groups available for reaction with the silane groups of the film-forming silane-containing compound and polymer. Such arms comprise about 3 to 30% by weight, preferably 10 to 20%, based on the weight of macromonomer, of polymerized ethylenically unsaturated hydroxy functionality-containing monomers, and about 70–95% by weight, based on the weight of the macromonomer, of at least one other polymerized ethylenically unsaturated monomer without such crosslinking functionality. Combinations of such hydroxy monomers with other lesser amounts of crosslinking functional groups, such as silane or epoxy, on the arms are also suitable.

The macromonomer arms attached to the core can contain polymerized monomers of alkyl methacrylate, alkyl acrylate, each having 1–12 carbon atoms in the alkyl group, as well as glycidyl acrylate or glycidyl methacrylate or ethylenically unsaturated monocarboxylic acid for anchoring and/or crosslinking. Typical useful hydroxy-containing monomers are hydroxyalkyl acrylates or methacrylates.

A preferred composition for a dispersed polymer that has hydroxy functionality comprises a core consisting of about 25% by weight of hydroxyethyl acrylate, about 4% by weight of methacrylic acid, about 46.5% by weight of methyl methacrylate, about 18% by weight of methyl acrylate, about 1.5% by weight of glycidyl methacrylate and about 5% of styrene. The macromonomer attached to the core contains 97.3% by weight of prepolymer and about 2.7% by weight of glycidyl methacrylate, the latter for crosslinking or anchoring.

A preferred prepolymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by dispersion polymerization of monomers in an organic solvent in the presence of a steric stabilizer for the particles. The procedure has been described as one of polymerizing the monomers in an inert solvent in which the monomers are soluble but the resulting polymer is not soluble, in the presence of a dissolved amphoteric stabilizing agent.

The Carrier (iv)

Conventional solvents and diluents can be employed as carriers in the composition of this invention to aid sprayability, flow, and leveling. Typical carriers include toluene, xylene, butyl acetate, acetone, methyl isobutyl ketone, methyl ethyl ketone, methanol, isopropanol, butanol, hexane, acetone, ethylene glycol monoethyl ether, VM&P® naphtha, mineral spirits, heptane and other aliphatic, cycloaliphatic, aromatic hydrocarbons, esters, ethers, ketones, and the like. They can be used in amounts of 0 to about 440 grams (or higher) per liter of coating composition. Preferably, they are employed in amounts not exceeding about 340 grams per liter of composition. Other useful carriers will readily occur to one skilled in the art.

The Catalyst (v)

Typical catalysts are dibutyl tin dilaurate, dibutyl tin diacetate, dibutyl tin dioxide, dibutyl tin dioctoate, tin octoate, aluminum titanate, aluminum chelates, zirconium chelate and the like. Tertiary amines and acids (blocked or unblocked) or combinations thereof are also useful for catalyzing silane bonding. Preferably, these catalysts are used in the amount of about 0.1 to 5.0% by weight of the composition. Other useful catalysts will readily occur to one skilled in the art.

Crosslinking Agents, Stabilizers, Pigments

The present coating composition can include an additional crosslinking agent, for example, monomeric or polymeric alkylated melamine formaldehyde resin that is partially or fully alkylated. One preferred crosslinking agent is a methylated and butylated or isobutylated melamine formaldehyde resin that has a degree of polymerization of about 1 to 3. Generally, this melamine formaldehyde resin contains about 50% butylated groups or isobutylated groups and 50% methylated groups. Such crosslinking agents typically have a number average molecular weight of about 300–600 and a weight average molecular weight of about 500–1500. Examples of commercially available resins are "Cymel" 1168, "Cymel" 1161, "Cymel" 1158, "Resimine" 4514 and "Resimine" 354. Preferably, the crosslinking agent is used in the amount of about 0–35% by weight, based on the weight of the binder. Other contemplated crosslinking agents are urea formaldehyde, benzoguanamine formaldehyde and blocked polyisocyanates.

To improve weatherability of a clear finish produced by the present coating composition, an ultraviolet light stabilizer or a combination of ultraviolet light stabilizers can be added in the amount of about 0.1–5% by weight based on the weight of the binder. Such stabilizers include ultraviolet light absorbers, screeners, quenchers, and hindered amine light stabilizers. Also, an antioxidant can be added in the amount of about 0.1–5% by weight based on the weight of the binder. Typical ultraviolet light stabilizers include benzophenones, triazoles, triazines, benzoates, hindered amines and mixtures thereof.

The composition can also include flow control agents such as Resiflow® S (acrylic terpolymer solution), BYK 320 and 325 (silicone additives); rheology control agents such as microgel and cellulose acetate butyrate, fumed silica; water scavenger such as tetrasilicate, trimethylorthoformate, triethylorthoformate, and the like.

When the present coating composition is used as a basecoat, typical pigments that can be added include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, metallic flake pigments such as aluminum flake, and the like.

The pigments can be introduced into the coating composition by first forming a mill base or pigment dispersion with any of the aforementioned polymers used in the coating composition or with another compatible polymer or dispersant by conventional techniques, such as high speed mixing, sand-grinding, ball-milling, attritor-grinding or two-roll-milling. The mill base is then blended with the other constituents used in the coating composition.

Application Techniques

The coating composition can be applied by conventional techniques such as spraying, electrostatic spraying, dipping, brushing, flowcoating and the like. The preferred techniques are spraying and electrostatic spraying. After application, the composition is typically baked at 100–150° C. for about 15–30 minutes to form a coating about 0.1–3.0 mils thick. However, room temperature cure is also effective. When the composition is used as a clearcoat, it is applied over the colorcoat which can be dried to a tack-free state and cured or preferably flash-dried for a short period before the clearcoat is applied. It is customary to apply a clear topcoat over a solvent-borne basecoat by means of a "wet-on-wet" application, i.e., the topcoat is applied to the basecoat without completely drying the basecoat. The coated substrate is then heated for a predetermined time period to allow simultaneous curing of the base and clear coats. Application over water-borne basecoat normally requires some period of drying of the basecoat before application of the clearcoat.

The coating composition of this invention is typically formulated as a one-package system although two-package systems are possible as will occur to one skilled in the art. The one-package system has been found to have extended shelf life.

A typical automobile steel panel or other substrate has several layers of coatings. The substrate is typically first coated with an inorganic rust-proofing zinc or iron phosphate layer over which is provided a primer which can be an electrocoated primer or a repair primer. Optionally, a primer-surfacer can be applied over the primer coating to provide for better appearance and/or improved adhesion of the basecoat to the primer coat. A pigmented basecoat or colorcoat is next applied over the primer-surfacer. A clear topcoat (clearcoat) is then applied to the pigmented basecoat (colorcoat). The colorcoat and clearcoat preferably have thicknesses of about 0.1–2.5 mils and 1.0–3.0 mils, respectively. A composition of this invention, depending on the presence of pigments or other conventional components, can be used as a basecoat, clearcoat, or primer. The composition is useful to coat other substrates as well such as polyester reinforced fiberglass, injection-molded polyurethanes, partially crystalline polyamides and other plastic and metallic substrates as will readily occur to one skilled in the art.

EXAMPLES

All parts and percentages are by weight unless otherwise indicated. Molecular weights were determined by gel permeation chromatography using a polystyrene standard. All microparticles employed to make compositions described in the following Examples were made by the procedure of Example 1. The coating compositions in the following Examples were made by combining the recited ingredients, in the order listed, with thorough mixing.

Commercially available materials used in the Examples are:

| Ingredient | Description | Manufacturer | Code ® |
|---|---|---|---|
| Melamine | Methylated/butylated melamine formaldehyde Resin | Monsanto Cytec | Resimene CE 6550 Cymel 1168 |
| UV Screener | Substituted Benzotriazole | Ciba | Tinuvin 384 |
| HALS | Hindered Amine Light Stabilizer | Ciba | Tinuvin 123 |
| Flow Agent | Acrylic Terpolymer Solution | Estron Chemical | Resiflow S |
| DDBSA | Dodecylbenzene sulfonic acid | King | Nacure XP-221 |
| AMP | 2-aminopropanol | Angus | AMP-95 |
| Water Scavenger | trimethylorthoformate | Huls | TMOF |

Example 1

A composition of this invention was prepared in a 350 gram batch by combining the following ingredients according to this recipe:

| Ingredients | Wt % Solids | Binder Solids | Weight | Batch (grams) |
|---|---|---|---|---|
| Cyclosilane (i) | 100.00 | 58.70 | 58.70 | 155.0 |
| Microparticles (iii) | 65.50 | 40.00 | 61.07 | 161.3 |
| n-Pentylpropionate (iv) | 0.00 | | 10.00 | 26.4 |
| Dibutyl tin diacetate (v) | 100.00 | 0.10 | 0.10 | 0.3 |
| DDBSA/AMP (v) | 44.99 | 1.20 | 2.67 | 7.0 |
| Totals | | 100.00 | 132.54 | 350.0 |

| Calculated Properties | |
|---|---|
| Solids | 75.45 |
| Volume Solids | 68.08 |
| Gallon weight | 8.66 |
| Volatile Organic Content (VOC) | 2.12 |
| Binder Composition | |
| Silane Compound | 58.70 |
| Microparticles | 40.00 |
| Acid Catalyst | 1.20 |
| Tin Catalyst | 0.10 |
| Total | 100.00 |

Compound (i) is an adduct formed from 1 mole of cyclohexanedimethanol and 2 moles of 3-isocyanatopropyltrimethoxysilane. It was prepared by loading 260 g cyclohexanedimethanol and 1 g of a 10% solution of dibutyltindilaurate in xylene to a flask. Then, 3-isocyanatopropyltrimethoxysilane was added by drip feeding at a rate of 15 ml per minute during which the temperature rose to 90° C. The reaction was then maintained at 90° C. for 2 hours.

The microparticle compound (iii) was formed as follows. First, a dispersant was made by copolymerizing the following monomers and then reacting the resulting copolymer with glycidyl methacrylate to place some polymerizable carbon-carbon double bonds on the molecule.

| Dispersant Monomers | |
|---|---|
| 14.73% | Styrene |
| 27.52% | Butyl Acrylate |
| 43.88% | Butyl Acrylate |
| 9.83% | Hydroxyethyl Acrylate |
| 2.30% | Methacrylic Acid |
| 1.5% | Glycidyl Methacrylate (reacted with the above polymer) |

Next, a mixture of monomers was polymerized in the presence of the above dispersant in a hydrocarbon solvent that dissolves the monomers but not the resulting polymer. The ratio was about 36 parts of dispersant to about 64 parts of the microparticle monomer mixture, which has the composition:

| Monomers | |
|---|---|
| 15.0% | Styrene |
| 18.0% | Methyl Acrylate |
| 36.5% | Methyl Methacrylate |
| 25.0% | Hydroxyethyl Acrylate |
| 4.0% | Methacrylic Acid |
| 1.5% | Glycidyl Methacrylate |

The resulting microparticle dispersion comprised polymer microparticles in a hydrocarbon diluent and was sterically stabilized against flocculation by the relatively nonpolar chains of the dispersant polymer.

Example 2

A composition of this invention was prepared in a 23.5 gram batch by combining the following ingredients according to this recipe:

| Ingredients | Wt % Solids | Binder Solids | Weight | Batch (grams) |
|---|---|---|---|---|
| Microgel | 70.00 | 4.00 | 5.71 | 1.00 |
| Melamine Cymel 1168 | 100.00 | 8.31 | 8.31 | 1.46 |
| Trimethylorthoformate | | | 4.00 | 0.70 |
| UV Screener | 95.00 | 2.00 | 2.11 | 0.37 |
| HALS | 100.00 | 2.00 | 2.00 | 0.35 |
| Flow Agent | 50.00 | 0.20 | 0.40 | 0.07 |
| Acrylosilane Resin (ii) | 81.00 | 28.04 | 34.62 | 6.07 |
| Silica Dispersion | 34.20 | 2.65 | 7.75 | 1.36 |
| Microparticles (iii) | 65.50 | 25.00 | 36.17 | 6.68 |
| Acrylic Polyol Resin | 79.00 | 6.50 | 8.23 | 1.44 |
| Disilanated Limonene (i) | 100.00 | 20.00 | 20.00 | 3.51 |
| Dibutyl tin diacetate (v) | 100.00 | 0.10 | 0.10 | 0.02 |
| DDBSA/AMP (v) | 44.99 | 1.20 | 2.67 | 0.47 |
| Totals | | 100.00 | 134.07 | 23.50 |

| Calculated Properties | |
|---|---|
| Weight Solids | 74.59 |
| Gallon Weight | 8.18 |
| Volume Solids | 65.98 |
| Volatile Organic Content (VOC) | 2.08 |
| Binder Composition | |
| Microgel | 2.31 |
| Melamine | 10.00 |
| UV Stabilizers | 4.00 |

-continued

| | |
|---|---|
| Flow Agent | 0.20 |
| Acrylosilane Resin | 28.04 |
| Silica | 0.70 |
| Microparticles | 25.00 |
| Acrylic Resin | 8.45 |
| Silane Compound | 20.00 |
| Acid Catalyst | 1.20 |
| Tin Catalyst | 0.10 |
| Total | 100.00 |

Compound (i) was prepared by hydrosilation of limonene with 2 moles of trichlorosilane at 90° C. under pressure for 8 hours in the presence of 2,2'-azobis (2-methylbutanenitrile) initiator to obtain the disubstituted trichlorosilane. Then subsequent treatment with methanol and simultaneous removal of hydrogen chloride converts the trichlorosilane to the trimethoxysilane. The final product was 1-methyl-2-trimethoxysilyl-4-(1-methyl-2-trimethoxysilylethyl) cyclohexane and isomers.

Microgel

A dispersed polymer microgel was prepared by charging the following constituents into a polymerization reactor equipped with a heat source and a reflux condensor. Microgel when used in following examples was prepared by this procedure.

| | Parts by Weight |
|---|---|
| Portion I | |
| Mineral Spirits ( b.p. 157–210° C.) | 97.614 |
| Heptane | 37.039 |
| 2,2'-azobis(2-methylbutanenitrile) | 1.395 |
| Methacrylate copolymer Stabilizer | 4.678 |
| Methyl methacrylate monomer | 15.187 |
| Portion II | |
| Methyl methacrylate monomer | 178.952 |
| Styrene monomer | 75.302 |
| Hydroxyethyl acrylate monomer | 23.455 |
| Mineral spirits (b.p. range 157–210° C.) | 32.387 |
| Heptane | 191.896 |
| N,N-dimethylethanolamine | 1.108 |
| Glycidyl methacrylate monomer | 2.816 |
| Methacrylate copolymer stabilizer | 58.271 |
| Methacrylic acid monomer | 2.816 |
| Portion III | |
| Toluene | 12.938 |
| Heptane | 30.319 |
| 2,2'-azobis(2-methylbutanenitrile) | 2.024 |
| Portion IV | |
| Heptane | 16.204 |
| Portion V | |
| Methylated/butylated melamine formaldehyde resin | 246.300 |
| Total | 1067.300 |

Portion I was charged to the reaction vessel and heated to its reflux temperature. It was held at reflux for 60 minutes. Then portions II and III were added simultaneously over a 180 minute period, while maintaining the resulting reaction mixture at its reflux temperature. Then portion IV was dumped to the reactor and the reaction mixture was held at reflux for 120 minutes. Excess solvent (246.3 parts ) was then stripped off and the reactor contents cooled to 215° F. After cooling, portion V was added and mixed 30 min while continuing to cool to 140° F. The resulting dispersion was at 70.0% weight solids.

Acrylosilane Resin

A polymer solution was prepared by charging the following constituents into continuous stirred tank polymerization reactors equipped with heat sources and reflux condensers. Acrylosilane resin when used in following examples was prepared by this procedure.

| | Parts by Weight |
|---|---|
| Portion I | |
| Styrene monomer | 138.560 |
| Cyclohexyl methacrylate monomer | 138.560 |
| γ-methacryloxypropyltrimethoxy silane monomer | 360.256 |
| Isobutyl methacrylate monomer | 55.424 |
| Ethylene glycol butyl ether acetate | 14.549 |
| Mineral spirits (b.p. range 157–210° C.) | 14.549 |
| Portion II | |
| t-Butylperoxyacetate | 22.170 |
| Ethylene glycol butyl ether acetate | 46.556 |
| Mineral spirits (b.p. range 157–210° C.) | 46.556 |
| Portion III | |
| t-Butylperoxyacetate | 2.770 |
| Ethylene glycol butyl ether acetate | 5.820 |
| Mineral spirits (b.p. range 157–210° C.) | 5.820 |
| Portion IV | |
| t-Butylperoxyacetate | 2.770 |
| Ethylene glycol butyl ether acetate | 5.820 |
| Mineral spirits (b.p. range 157–210° C.) | 5.820 |
| Total | 866.000 |

In specification resin was charged to each reactor of a continuous stirred tank polymerization system to the following levels: $R^1$=45%, $R^2$=50% and $R^3$=60%. The reactors were then heated under pressure to the following specifications: $R^1$=210° C., 25 psi, $R^2$=150° C., 19 psi and $R^3$=135° C., atmospheric pressure. Feeds of each portion and transfers between reactors were then initiated. Portion I was fed to $R^1$ at a flow rate of 43.2 parts/hour, portion II was fed to R1 at a flow rate of 6.9 parts/hour, portion III was fed to $R^2$ at a rate of 0.86 parts/hour and portion IV was fed to $R^3$ at a rate of 0.86 parts/hour. The final product was continuously transferred from $R^3$ to a storage tank. The resulting acrylosilane resin was at 85.0% weight solids.

Acrylic Polyol Resin

A polymer solution was prepared by charging the following constituents into continuous stirred tank polymerization reactors equipped with heat sources and reflux condensers. Acrylic polyol resin when used in following examples was prepared by this procedure.

|  | Parts by Weight |
|---|---|
| Portion I | |
| Hydroxypropyl monomer | 232.300 |
| Isobutyl methacrylate monomer | 132.800 |
| Styrene monomer | 199.100 |
| Butyl acrylate monomer | 99.600 |
| Aromatic Hydrocarbon (b.p. range 155–177° C.) | 30.800 |
| Portion II | |
| t-Butylperoxyacetate | 56.440 |
| Aromatic Hydrocarbon (b.p. range 155–177° C.) | 105.400 |
| Portion III | |
| t-Butylperoxyacetate | 4.980 |
| Aromatic Hydrocarbon (b.p. range 155–177° C.) | 9.300 |
| Portion IV | |
| t-Butylperoxyacetate | 4.980 |
| Aromatic Hydrocarbon (b.p. range 155–177° C.) | 9.300 |
| Total | 885.000 |

In specification resin was charged to each reactor of a continuous stirred tank polymerization system to 10% of capacity. The reactors were then heated under pressure to the following specifications: $R^1=190°$ C., 20 psi, $R^2=155°$ C., 15 psi and $R^3=133°$ C., atmospheric pressure. Feeds of each portion and transfers between reactors were then initiated. Portion I was fed to $R^1$ at a flow rate of 6.64 parts/minute, portion II was fed to $R^1$ at a flow rate of 1.541 parts/minute, portion III is fed to $R^2$ at a rate of 0.136 parts/minute and portion IV was fed to $R^3$ at a rate of 0.136 parts/minute. The final product was continuously transferred from $R^3$ to a storage tank. The resulting acrylic polyol resin was at 80.0% weight solids.

Silica Dispersion

A silica dispersion was made by first preparing a dispersant polymer and then dispersing the silica by a grinding process. Silica Dispersion when used in following examples was prepared by this procedure.

|  | Parts by Weight |
|---|---|
| Portion I | |
| Xylene | 165.794 |
| Portion II | |
| Butyl methacrylate monomer | 349.686 |
| Hydroxypropyl acrylate | 233.131 |
| Portion III | |
| t-Butylperoxyacetate | 17.485 |
| Xylene | 28.615 |
| Portion IV | |
| Xylene | 4.995 |
| Portion V | |
| Xylene | 45.294 |
| Total | 845.000 |

Portion I was charged to the reaction vessel and heated to its reflux temperature. Then portion II was added over a 400 minute period simultaneously with portion III started at the same time as portion II but added over a 415 minute period, while maintaining the resulting reaction mixture at its reflux temperature. Then portion IV was added to the reactor and the reaction mixture was held at reflux for 40 minutes. Heating was removed and then portion V was added to thin the batch. The resulting acrylic dispersant resin was at 70.0% weight solids.

|  | Parts by Weight |
|---|---|
| Portion I | |
| Xylene | 35.000 |
| Butanol | 20.000 |
| Dispersant Resin | 36.000 |
| Portion II | |
| Hydrophobic Amorphous Fused Silica | 9.000 |
| Total | 100.000 |

Load portion I to a horizontal media mill previously loaded with zirconia media at a level of 270 lbs for a 25 gallon mill. Maintain mill temperature at 100–120° F. Then add portion II at slow speed followed by high speed grinding for 20 minutes. The dispersion was then filtered through a 10 micron filter to obtain the final product.

Example 3

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 27.50 |
| Trimethylorthoformate | | | 4.64 | 12.48 |
| UV Screener | 95.00 | 2.20 | 2.32 | 6.23 |
| HALS | 100.00 | 2.20 | 2.20 | 5.92 |
| Flow Agent | 50.00 | 0.20 | 0.40 | 1.08 |
| Dual Functional Acrylosilane (ii) | 77.10 | 31.00 | 40.21 | 108.14 |
| Microparticles (iii) | 65.50 | 20.00 | 30.53 | 82.12 |
| Tris(2-trimethoxysilylethyl) cyclohexane (i) | 89.80 | 33.00 | 36.75 | 98.83 |

-continued

| | | | | |
|---|---|---|---|---|
| Dibutyl tin diacetate (v) | 100.00 | 0.20 | 0.20 | 0.54 |
| DDBSA/AMP (v) | 44.99 | 1.20 | 2.67 | 7.17 |
| Totals | | 100.00 | 130.14 | 350.00 |

| Calculated Properties | |
|---|---|
| Weight Solids | 76.84 |
| Gallon Weight | 8.57 |
| Volume Solids | 72.05 |
| Volatile Organic Content (VOC) | 1.99 |
| Binder Composition | |
| Melamine | 10.00 |
| UV Stabilizers | 4.40 |
| Flow Agent | 0.20 |
| Acrylosilane Resin | 31.00 |
| Microparticles | 20.00 |
| Silane Compound | 33.00 |
| Acid Catalyst | 1.20 |
| Tin Catalyst | 0.20 |
| Total | 100.00 |

Compound (i) was prepared by hydrosilation of one mole of 1,2,4-trivinylcyclohexane with 3 moles of trichlorosilane in the presence of platinum catalyst to obtain the 1,2,4-tris (trichlorosilylethyl)cyclohexane and subsequent treatment with methanol to convert to the 1,2,4-tris (2-trimethoxysilylethyl)cyclohexane. A method known in the art.

Compound (ii) was prepared using the following recipe. Dual functional acrylosilane resin, so named because it contains both alkoxysilane and hydroxy functionality, when used in following examples was prepared by this procedure.

| | Parts by Weight |
|---|---|
| Portion I | |
| n-Amyl acetate | 1089.25 |
| 2-Ethylhexanol | 1089.25 |
| Portion II | |
| 2-Ethylhexanol | 472.01 |
| n-Amyl acetate | 472.01 |
| 2,2'-azobis(2-methylbutanenitrile) | 798.67 |
| Portion III | |
| Styrene Monomer | 2939.90 |
| Cyclohexyl methacrylate | 2155.99 |
| i-Butyl Methacrylate | 783.90 |
| γ-methacryloxypropyltrimethoxy silane monomer | 979.97 |
| Hydroxyethyl methacrylate | 2939.90 |
| Portion IV | |
| n-Amyl acetate | 22.51 |
| t-Butylperoxyacetate | 49.02 |
| Total | 13792.38 |

Portion I was charged to the reaction vessel and heated to its reflux temperature (160–170° C.). Then portions II and III were added simultaneously over a 480 minute period while maintaining the resulting reaction mixture at its reflux temperature. The reaction was held 15 minutes at reflux after portions II and III are all in. Then the temperature was lowered to 130° C., portion IV was added to the reactor and the reaction mixture was held at 130° C. 1 hour. The resulting dual functional acrylosilane resin was at 77.1% weight solids.

Example 4

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 26.65 |
| Trimethylorthoformate | | | 4.64 | 12.09 |
| UV Screener | 95.00 | 2.20 | 2.32 | .6.04 |
| HALS | 100.00 | 2.20 | 2.20 | 5.73 |
| Flow Agent | 50.00 | 0.20 | 0.40 | 1.04 |
| Dual Functional Acrylosilane (ii) | 77.10 | 31.00 | 40.21 | 104.80 |
| Microparticles (iii) | 65.50 | 20.00 | 30.53 | 79.59 |
| Disilanated Vinylnorbornene | 80.70 | 33.00 | 40.89 | 106.58 |
| Dibutyl tin diacetate (v) | 100.00 | 0.20 | 0.20 | 0.52 |
| DDBSA/AMP (v) | 44.99 | 1.20 | 2.67 | 6.95 |
| Totals | | 100.00 | 134.28 | 350.00 |

| Calculated Properties | |
|---|---|
| Weight Solids | 74.47 |
| Gallon Weight | 6.63 |
| Volume Solids | 69.84 |
| Volatile Organic Content (VOC) | 2.20 |
| Binder Composition | |
| Melamine | 10.00 |
| UV Stabilizers | 4.40 |
| Flow Agent | 0.20 |
| Acrylosilane Resin | 31.00 |
| Microparticles | 20.00 |
| Silane Compound | 33.00 |
| Acid Catalyst | 1.20 |
| Tin Catalyst | 0.20 |
| Total | 100.00 |

Compound (i) was prepared by hydrosilation of vinylnorbornene. Then, 100 g of vinylnorbornene, 320 g trichlorosilane and 0.6 g of platinum divinyl complex was heated in a pressure reactor at 115° C. for 4 hours. Excess trichlorosilane was stripped under vaccuum. To the reaction product was added dropwise a mixture of 115 g anhydrous methanol and 530 g of trimethlorthoformate under vaccuum. After the addition was complete 15 g triethylamine was added and the reaction mixture refluxed 2 hours. Volatiles were stripped off and solids removed by filtration. The reaction mixture was then distilled at 80–100° C., 0.03–0.10 Torr to give the product 2-trimethoxysilyl-5-(2-trimeyhoxysilylethyl) norbornane.

Example 5

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 26.52 |
| Trimethylorthoformate | | | 4.64 | 12.03 |
| UV Screener | 95.00 | 2.20 | 2.32 | 6.01 |
| HALS | 100.00 | 2.20 | 2.20 | 5.71 |
| Flow Agent | 50.00 | 0.20 | 0.40 | 1.04 |

-continued

| | | | | |
|---|---|---|---|---|
| Dual Functional Acrylosilane (ii) | 77.10 | 31.00 | 40.21 | 104.28 |
| Microparticles (iii) | 65.50 | 20.00 | 30.53 | 79.19 |
| Silanated Star Polyester (i) | 79.40 | 33.00 | 41.56 | 107.78 |
| Dibutyl tin diacetate (v) | 100.00 | 0.20 | 0.20 | 0.52 |
| DDBSA/AMP (v) | 44.99 | 1.20 | 2.67 | 6.92 |
| Totals | | 100.00 | 134.95 | 350.00 |

Calculated Properties

| | |
|---|---|
| Weight Solids | 74.10 |
| Gallon Weight | 8.60 |
| Volume Solids | 69.52 |
| Volatile Organic Content (VOC) | 2.23 |

Binder Composition

| | |
|---|---|
| Melamine | 10.00 |
| UV Stabilizers | 4.40 |
| Flow Agent | 0.20 |
| Acrylosilane Resin | 31.00 |
| Microparticles | 20.00 |
| Silane Compound | 33.00 |
| Acid Catalyst | 1.20 |
| Tin Catalyst | 0.20 |
| Total | 100.00 |

Compound (i) was prepared by using the following recipe. The star polester must first be prepared according to the recipe shown below. Silanated star polyester, when used in following examples, was prepared by this procedure.

| | Parts by Weight |
|---|---|
| Portion I | |
| Butyl acetate | 38.300 |
| Methylhexahydrophthalic anhydride | 282.300 |
| Portion II | |
| Pentaerythritol | 68.120 |
| Portion III | |
| Cardura-E, glycidyl ester of $C_{10}$ acid | 375.580 |
| Portion IV | |
| Butyl Acetate | 1.914 |
| Portion V | |
| Dibutyltindilaurate | 0.696 |
| Butyl acetate | 4.350 |
| Portion VI | |
| Butyl Acetate | 98.740 |
| Total | 870.000 |

Portion I was charged to the reaction followed by Portion II. The batch was heated to reflux and held at reflux for 1 hour. Portion III was then added over a 30 minute period. After the hold period Portions IV, V and VI were added and the reaction was held at reflux for 1 hour or until the acid number was less than 3. Then Portion VI was added and the batch was filtered and cooled. The resulting star polyester resin is at 80.0% weight solids.

Compound (i) was prepared by reacting 1500 g of Star polyester with 410 g of 3-isocyanatopropyltrimethoxysilane in the presence of a small amount of tin catalyst. The reactants were added to a suitable vessel blanketed with nitrogen to exclude moisture. The batch was stirred three hours during which the temperature can reach about 140° F. After cooling the vessel was sealed and the reaction was allowed to continue overnight.

Example 6

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 26.75 |
| Trimethylorthoformate | | | 4.64 | 12.14 |
| UV Screener | 95.00 | 2.20 | 2.32 | 6.06 |
| HALS | 100.00 | 2.20 | 2.20 | 5.76 |
| Flow Agent | 50.00 | 0.20 | 0.40 | 1.05 |
| Dual Functional Acrylosilane (ii) | 77.10 | 31.00 | 40.21 | 105.19 |
| Microparticles (iii) | 65.50 | 20.00 | 30.53 | 79.88 |
| Silanated Star Polyester (i) | 81.70 | 33.00 | 41.56 | 105.67 |
| Dibutyl tin diacetate (v) | 100.00 | 0.20 | 0.20 | 0.52 |
| DDBSA/AMP (v) | 44.99 | 1.20 | 2.67 | 6.98 |
| Totals | | 100.00 | 134.95 | 350.00 |

Calculated Properties

| | |
|---|---|
| Weight Solids | 74.75 |
| Gallon Weight | 8.65 |
| Volume Solids | 70.09 |
| Volatile Organic Content (VOC) | 2.18 |

Binder Composition

| | |
|---|---|
| Melamine | 10.00 |
| UV Stabilizers | 4.40 |
| Flow Agent | 0.20 |
| Acrylosilane Resin | 31.00 |
| Microparticles | 20.00 |
| Silane compound | 33.00 |
| Acid Catalyst | 1.20 |
| Tin Catalyst | 0.20 |
| Total | 100.00 |

Compound (i) was prepared by using the following recipe. The star polester must first be prepared according to the recipe shown in Example 5. Then compound (i) was prepared as shown in Example 5 except 1860 g of star polyester was reacted with 762 g of 3-isocyanatopropyltrimethoxysilane. Compound (i) in this example has a higher silane content than in Example 5.

Example 7

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 27.46 |
| Trimethylorthoformate | | | 4.64 | 12.46 |
| UV Screener | 95.00 | 2.20 | 2.32 | 6.22 |
| HALS | 100.00 | 2.20 | 2.20 | 5.91 |
| Flow Agent | 50.00 | 0.20 | 0.40 | 1.07 |
| Dual Functional | 77.10 | 31.00 | 40.21 | 108.00 |

-continued

| | | | | |
|---|---|---|---|---|
| Acrylosilane (ii) | | | | |
| Microparticles (iii) | 65.50 | 20.00 | 30.53 | 82.02 |
| Cyclosilane (i) | 100.00 | 33.00 | 41.56 | 99.15 |
| Dibutyl tin diacetate (v) | 100.00 | 0.20 | 0.20 | 0.54 |
| DDBSA/AMP (v) | 44.99 | 1.20 | 2.67 | 7.16 |
| Totals | | 100.00 | 134.95 | 350.00 |

| Calculated Properties | |
|---|---|
| Weight Solids | 76.74 |
| Gallon Weight | 8.74 |
| Volume Solids | 71.77 |
| Volatile Organic Content (VOC) | 2.03 |
| Binder Composition | |
| Melamine | 10.00 |
| UV Stabilizers | 4.40 |
| Flow Agent | 0.20 |
| Acrylosilane Resin | 31.00 |
| Microparticles | 20.00 |
| Silane Compound | 33.00 |
| Acid catalyst | 1.20 |
| Tin Catalyst | 0.20 |
| Total | 100.00 |

Compound (i) was prepared as shown in Example 1. In this example, compound (i) was used with dual functional acrylosilane.

Example 8

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 27.60 |
| Trimethylorthoformate | | | 4.64 | 12.53 |
| UV Screener | 95.00 | 2.20 | 2.32 | 6.25 |
| HALS | 100.00 | 2.20 | 2.20 | 5.94 |
| Flow Agent | 50.00 | 0.20 | 0.40 | 1.08 |
| Dual Functional Acrylosilane (ii) | 77.10 | 31.00 | 40.21 | 84.04 |
| Microparticles (iii) | 65.50 | 20.00 | 30.53 | 82.43 |
| Silanated star polyester (i) | 82.90 | 33.00 | 41.56 | 65.13 |
| Disilanated Limonene (i) | 100.00 | 20.00 | 21.21 | 57.26 |
| Dibutyl tin diacetate (v) | 100.00 | 0.20 | 0.20 | 0.54 |
| DDBSA/AMP (v) | 44.99 | 1.20 | 2.67 | 7.20 |
| Totals | | 100.00 | 134.95 | 350.00 |

| Calculated Properties | |
|---|---|
| Weight Solids | 77.13 |
| Gallon Weight | 8.60 |
| Volume Solids | 71.56 |
| Volatile Organic Content (VOC) | 1.97 |
| Binder Composition | |
| Melamine | 10.00 |
| UV Stabilizers | 4.40 |
| Flow Agent | 0.20 |
| Acrylosilane Resin | 24.00 |
| Microparticles | 20.00 |
| Silane Compound | 40.00 |
| Acid Catalyst | 1.20 |
| Tin Catalyst | 0.20 |
| Total | 100.00 |

Compound (i), silanated star polyester in this example was prepared as shown in Example 5 except 3720 g. of star polyester and 1524 g of 3-isocyanatopropyltrimethoxysilane was used in the preparation.

Example 9

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 27.38 |
| Trimethylorthoformate | | | 4.64 | 12.42 |
| UV Screener | 95.00 | 2.20 | 2.32 | 6.20 |
| HALS | 100.00 | 2.20 | 2.20 | 5.89 |
| Flow Agent | 50.00 | 0.20 | 0.40 | 1.07 |
| Dual Functional Acrylosilane (ii) | 77.10 | 31.00 | 40.21 | 83.35 |
| Microparticles (iii) | 65.50 | 20.00 | 30.53 | 81.77 |
| Silanated star polyester (i) | 82.90 | 33.00 | 41.56 | 64.60 |
| Tris(2-trimethoxysilylethyl) cyclohexane (i) | 89.80 | 33.00 | 36.75 | 59.64 |
| Dibutyl tin diacetate (v) | 100.00 | 0.20 | 0.20 | 0.54 |
| DDBSA/AMP (v) | 44.99 | 1.20 | 2.67 | 7.14 |
| Totals | | 100.00 | 134.95 | 350.00 |

| Calculated Properties | |
|---|---|
| Weight Solids | 76.51 |
| Gallon Weight | 8.60 |
| Volume Solids | 71.01 |
| Volatile Organic Content (VOC) | 2.02 |
| Binder Composition | |
| Melamine | 10.00 |
| UV Stabilizers | 4.40 |
| Flow Agent | 0.20 |
| Acrylosilane Resin | 24.00 |
| Microparticles | 20.00 |
| Silane Compound | 40.00 |
| Acid Catalyst | 1.20 |
| Tin Catalyst | 0.20 |
| Total | 100.00 |

Compound (i), silanated star polyester in this example was prepared as shown in Example 8.

Example 10

A composition of this invention was prepared in a 350 gram batch by combining the following ingredients according to this recipe:

| Ingredients | Wt % Solids | Binder Solids | Weight | Batch (grams) |
|---|---|---|---|---|
| Melamine CE 6550 | 97.6 | 10.00 | 10.22 | 27.52 |
| Trimethylorthoformate | | | 4.64 | 12.49 |

-continued

| | | | | |
|---|---|---|---|---|
| UV Screener | 95.00 | 2.20 | 2.32 | 6.23 |
| HALS | 100.00 | 2.20 | 2.20 | 5.92 |
| Flow Agent | 50.00 | 0.20 | 0.40 | 1.08 |
| Dual Functional Acrylosilane (ii) | 77.10 | 31.00 | 40.21 | 83.77 |
| Microparticles (iii) | 65.50 | 20.00 | 30.53 | 82.17 |
| Silanated star polyester (i) | 85.20 | 33.00 | 41.56 | 63.17 |
| Tris(2-trimethoxysilylethyl) cyclohexane (i) | 89.80 | 33.00 | 36.75 | 59.94 |
| Dibutyl tin diacetate (v) | 100.00 | 0.20 | 0.20 | 0.54 |
| DDBSA/AMP (v) | 44.99 | 1.20 | 2.67 | 7.18 |
| Totals | | 100.00 | 134.95 | 350.00 |

Calculated Properties

| | |
|---|---|
| Weight Solids | 76.89 |
| Gallon Weight | 8.60 |
| Volume Solids | 71.35 |
| Volatile Organic Content (VOC) | 1.99 |

Binder Composition

| | |
|---|---|
| Melamine | 10.00 |
| UV Stabilizers | 4.40 |
| Flow Agent | 0.20 |
| Acrylosilane Resin | 24.00 |
| Microparticles | 20.00 |
| Silane Compound | 40.00 |
| Acid Catalyst | 1.20 |
| Tin Catalyst | 0.20 |
| Total | 100.00 |

The star polyester used in this example was prepared as shown in Example 5 except the glycidyl ester of $C_{10}$ carboxylic acid was replaced with the glycidyl ester of $C_5$ carboxylic acid on a molecular basis.

Compound (i), silanated star polyester was prepared as shown in Example 5 except 3720 g of star polyester and 1524 g of 3-isocyanatopropyltrimethoxysilane was used in the preparation.

Example 11

A composition of this invention was prepared in a 2500 gram batch by combining the following ingredients according to this recipe:

| Ingredients | Wt % Solids | Binder Solids | Weight | Batch (grams) |
|---|---|---|---|---|
| Acrylosilane Resin (ii) | 81.00 | 31.47 | 38.85 | 772.4 |
| Cyclosilane (i) | 100.00 | 20.00 | 20.00 | 397.6 |
| Tris(2-trimethoxysilylethyl) cyclohexane (i) | 100.00 | 10.00 | 10.00 | 198.8 |
| Melamine CE6550 | 97.8 | 10.00 | 10.22 | 203.3 |
| UV Screener | 95.00 | 2.00 | 2.11 | 41.9 |
| HALS | 100.00 | 2.00 | 2.00 | 39.8 |
| Flow Agent | 50.00 | 0.20 | 0.40 | 8.0 |
| Microparticles (iii) | 65.50 | 20.00 | 30.53 | 607.1 |
| Silica Dispersion | 34.20 | 3.03 | 8.86 | 176.1 |
| Dibutyl tin diacetate (v) | 100.00 | 0.10 | 0.10 | 2.0 |
| DDBSA/AMP (v) | 44.99 | 1.20 | 2.67 | 53.0 |
| Totals | | 100.00 | 134.07 | 2500.0 |

Calculated Properties

| | |
|---|---|
| Weight Solids | 79.53 |
| Gallon Weight | 8.42 |
| Volume Solids | 69.77 |
| Volatile Organic Content (VOC) | 1.72 |

Binder Composition

| | |
|---|---|
| Melamine | 10.00 |
| UV Stabilizers | 4.00 |
| Flow Agent | 0.20 |
| Acrylosilane Resin | 31.47 |
| Silica | 0.80 |
| Microparticles | 20.00 |
| Acrylic Resin | 2.23 |
| Silane Compound | 30.00 |
| Acid Catalyst | 1.20 |
| Tin Catalyst | 0.10 |
| Total | 100.00 |

Example 12

A composition of this invention was prepared in a 700 gram batch by combining the following

| Ingredients | Wt % Solids | Binder Solids | Weight | Batch (grams) |
|---|---|---|---|---|
| Melamine CE 6550 | 97.8 | 10.00 | 10.22 | 53.97 |
| Trimethylorthoformate | | | 4.64 | 24.49 |
| UV Screener | 95.00 | 2.20 | 2.32 | 12.22 |
| HALS | 100.00 | 2.20 | 2.20 | 11.61 |
| Flow Agent | 50.00 | 0.20 | 0.40 | 2.11 |
| Dual Functional Acrylosilane (ii) | 77.10 | 25.00 | 32.43 | 171.13 |
| Microparticles (iii) | 65.50 | 20.00 | 30.53 | 161.15 |
| Silanated star polyester (i) | 82.90 | 13.00 | 16.37 | 86.41 |
| Cyclosilane (i) | 89.80 | 13.00 | 14.54 | 76.75 |
| Disilanated Vinylnorbornene | 80.70 | 13.00 | 16.11 | 85.02 |
| Dibutyl tin diacetate (v) | 100.00 | 0.20 | 0.20 | 1.06 |
| DDBSA/AMP (v) | 44.99 | 1.20 | 2.67 | 14.08 |
| Totals | | 100.00 | 134.95 | 700.00 |

Calculated Properties

| | |
|---|---|
| Weight Solids | 75.40 |
| Gallon weight | 8.68 |
| Volume Solids | 70.01 |
| Volatile Organic Content (VOC) | 2.14 |

Binder Composition

| | |
|---|---|
| Melamine | 10.00 |
| UV Stabilizers | 4.40 |
| Flow Agent | 0.20 |
| Acrylosilane Resin | 25.00 |
| Microparticles | 20.00 |
| Silane Compound | 39.00 |
| Acid Catalyst | 1.20 |
| Tin Catalyst | 0.20 |
| Total | 100.00 |

Compound (i), silanated star polyester in this example was prepared as shown in Example 8.

Example 13

A composition of this invention was prepared in a 700 gram batch by combining the following ingredients according to this recipe:

| Ingredients | Wt % Solids | Binder Solids | Weight | Batch (grams) |
|---|---|---|---|---|
| Melamine CE 6550 | 97.8 | 10.00 | 10.22 | 54.38 |
| Trimethylorthoformate | | | 4.64 | 24.68 |
| UV Screener | 95.00 | 2.20 | 2.32 | 12.32 |
| HALS | 160.00 | 2.20 | 2.20 | 11.70 |
| Flow Agent | 50.00 | 0.20 | 0.40 | 2.13 |
| Dual Functional Acrylosilane (ii) | 77.10 | 24.00 | 32.43 | 165.55 |
| Microparticles (iii) | 65.50 | 20.00 | 30.53 | 162.39 |
| Silanated star polyester (i) | 82.90 | 10.00 | 16.37 | 66.98 |
| Cyclosilane (i) | 89.40 | 10.00 | 14.54 | 59.49 |
| Tris(2-trimethoxysilylethyl)cyclohexane (i) | 89.80 | 10.00 | 11.14 | 59.23 |
| Disilanated Vinylnorbornene | 80.70 | 10.00 | 16.11 | 65.90 |
| Dibutyl tin diacetate (v) | 100.00 | 0.20 | 0.20 | 1.06 |
| DDBSA/AMP (v) | 44.99 | 1.20 | 2.67 | 14.19 |
| Totals | | 100.00 | 134.95 | 700.00 |

| Calculated Properties | |
|---|---|
| Weight Solids | 75.98 |
| Gallon Weight | 8.66 |
| Volume Solids | 70.46 |
| Volatile Organic Content (VOC) | 2.08 |

| Binder Composition | |
|---|---|
| Melamine | 10.00 |
| UV Stabilizers | 4.40 |
| Flow Agent | 0.20 |
| Acrylosilane Resin | 24.00 |
| Microparticles | 20.00 |
| Silane Compound | 40.00 |
| Acid Catalyst | 1.20 |
| Tin Catalyst | 0.20 |
| Total | 100.00 |

Compound (i), silanated star polyester in this example was prepared as shown in Example 8.

Example 14

A composition of this invention can be prepared in a 1000 gram batch by combining the following ingredients according to this recipe:

| Ingredients | Wt % Solids | Binder Solids | Weight | Batch (grams) |
|---|---|---|---|---|
| Microgel | 70.00 | 4.00 | 5.71 | 46.18 |
| Melamine Cymel 1168 | 100.00 | 10.31 | 10.31 | 83.32 |
| UV Screener | 95.00 | 2.00 | 2.11 | 17.01 |
| HALS | 100.00 | 2.00 | 2.00 | 16.16 |
| Flow Agent | 50.00 | 0.20 | 0.40 | 3.23 |
| Acrylosilane Resin (ii) | 81.00 | 30.19 | 37.27 | 301.22 |
| Microparticles (iii) | 65.50 | 25.00 | 38.17 | 308.46 |
| Amine/Isocyanate Adduct (i) | 100.00 | 25.00 | 25.00 | 202.04 |
| Dibutyl tin diacetate (v) | 100.00 | 0.10 | 0.10 | 0.81 |
| DDBSA/AMP (v) | 44.99 | 1.20 | 2.67 | 21.56 |
| Totals | | 100.00 | 134.07 | 1000.00 |

| Calculated Properties | |
|---|---|
| Weight Solids | 80.82 |
| Gallon Weight | 8.68 |
| Volume Solids | 70.98 |
| Volatile Organic Content (VOC) | 1.67 |

| Binder Composition | |
|---|---|
| Microgel | 2.31 |
| Melamine | 12.00 |
| UV Stabilizers | 4.00 |
| Flow Agent | 0.20 |
| Acrylosilane Resin | 30.19 |
| Microparticles | 25.00 |
| Silane Compound | 25.00 |
| Acid Catalyst | 1.20 |
| Tin Catalyst | 0.10 |
| Total | 100.00 |

Compound (i) can be prepared by mixing in a suitable vessel equipped with a nitrogen blanket 2 moles of 3-aminopropyltrimethoxysilane with 1 mole of 1,6-hexanedisocyanate) at room temperature and allowing to stand until the isocyanate peak is absent from the infrared spectrum. The final product is bis(3-trimethoxysilylpropylureido)hexane.

Example 15

A composition of this invention can be prepared in a 1000 gram batch by combining the ingredients according to the recipe given in Example 14 substituting Compound (i) shown below.

Compound (i) can be prepared for this example by mixing in a suitable vessel equipped with a nitrogen blanket 2 moles of epoxypropyltrimethoxysilane with 1 mole of cyclohexane-1,2-dicarboxylic acid and heating to 120° C. The reaction is allowed to continue until substantially all the acid has reacted as shown by acid number determination. The final product is bis(3-trimethoxysilyl-2-hydroxypropyl)cyclohexane-1,2-dicarboxylate.

Example 16

A composition of this invention can be prepared in a 1000 gram batch by combining the ingredients according to the recipe given in Example 14 substituting Compound (i) shown below.

Compound (i) can be prepared for this example by mixing in a suitable vessel equipped with a nitrogen blanket 2 moles of allyl alcohol with 1 mole of dimethyl adipate and heating to 90° C. Methanol is distilled from the reaction until a quantitative amount is obtained. One mole of the intermediate product, diallyl adipate is hydrosilanated with 2 moles of trimethoxysilane by methods known in the art to produce the disilanated product.The final product is bis(3-trimethoxysilylpropyl) adipate.

Example 17

A composition of this invention can be prepared in a 1000 gram batch by combining the ingredients according to the recipe given in Example 14 substituting Compound (i) shown below.

Compound (i) can be prepared for this example by mixing in a suitable vessel equipped with a nitrogen blanket 3 moles of methyl vinylacetate with 1 mole of trimethylolpropane and heating to 90° C. Methanol is distilled from the reaction until a quantitative amount is obtained. The final product is the 4-trimethoxysilylbutyric acid triester of trimethylolpropane.

Example 18

A composition of this invention was prepared in a 500 gram batch by combining the following ingredients according to this recipe:

| Ingredients | Wt % Solids | Binder Solids | Weight | Batch (grams) |
|---|---|---|---|---|
| Microparticles (iii) | 65.50 | 15.00 | 22.90 | 97.12 |
| Melamine Cymel 1168 | 100.00 | 5.00 | 5.00 | 21.21 |
| Cyclosilane (i) | 93.70 | 51.00 | 51.00 | 216.30 |
| Acrylosilane Resin (ii) | 81.00 | 27.80 | 34.32 | 145.56 |
| Dibutyl tin diacetate (v) | 100.00 | 0.20 | 0.20 | 0.85 |
| DDBSA/AMP(V) | 44.99 | 1.00 | 2.25 | 9.54 |
| Xylene (iv) | | | | |
| Totals | | 100.00 | 117.89 | 500.00 |

| Calculated Properties | |
|---|---|
| Weight Solids | 84.82 |
| Gallon Weight | 8.88 |
| Volume Solids | 80.12 |
| Volatile Organic Content (VOC) | 1.35 |
| Binder Composition | |
| Melamine | 5.00 |
| Acrylosilane Resin | 27.80 |
| Microparticles | 15.00 |
| Silane Compound | 51.00 |
| Acid Catalyst | 1.00 |
| Tin Catalyst | 0.20 |
| Total | 100.00 |

Example A

A composition of the invention was prepared according to the recipe of Example 2 with the exception that compound (i) was

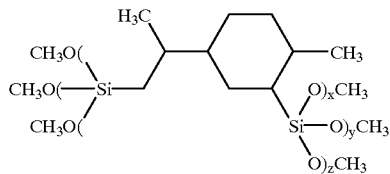

wherein x, y and z are independently 1 to 3.

Example B

A composition of the invention was prepared according to the recipe of Example 4 with the exception that compound (i) was

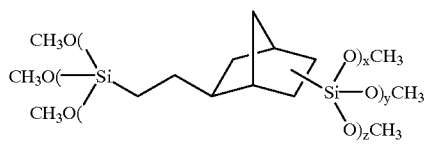

wherein x, y and z are independently 1 to 3.

Example C

A process for making compound (i) described in Example A is as follows.

A mixture of bis(trimethoxysilyl)limonene (470 g, 1.24 mole), water (16 g, 0.89 mole) and dodecylbenzenesulfonic acid, amine salt (5.0 g) was reacted for 12 hours at room temperature. Thus, the ratio of water/silane group would be 0.72 (0.89 mole of water/1.24 mole silane) and since, bis(trimethoxysilyl)limonene has 6 silane groups, the molar ratio would be 0.72÷6=about 0.12. The volatility of bis(trimethoxysilyl)limonene when measured at a baking temperature of 140° C. for 30 minutes was 22.8 weight percent based on 100 parts bis(trimethoxysilyl)limonene. Volatiles (57.6 g) were removed under vacuum. The cloudy product was diluted with 500 ml of anhydrous hexanes and filtered through dry silica gel 60 and dry decolorizing activated carbon under nitrogen. Volatiles were removed under vacuum. Product was a colorless liquid, viscosity 6.4 poise, containing <7% starting monomer (by GC), a dimer as a major component (>50% by weight) and a small amount of trimer (by KIDS mass spectroscopy). The oligomers showed significantly enhanced solids residue 93.6% vs. the monomer, when small samples were heated for 1 hour at 220° F. Compounds were also made wherein the viscosities in poises were 1.0, 1.4, 3.2, 5.2, 6.1, 14, 15 and 16.

Example D

A process for making compound (i) described in Example B is as follows.

A mixture of 5-(2-trimethoxysilylethyl)-trimethoxysilylnorbornane (290 g, 0.80 mole), water (9.0 g, 0.50 mole) and dodecylbenzenesulfonic acid, amine salt (3.0 g) was reacted for 12 hours at room temperature. Thus, the ratio of water/silane group would be 0.63 (0.50 mole of water/0.80 mole silane) and since, 5-(2-trimethoxysilylethyl)-trimethoxysilylnorbornane has 6 silane groups, the molar ratio would be about 0.63÷6=about 0.10. Volatiles were removed under vacuum. The cloudy product was diluted with 300 ml of anhydrous hexanes and filtered through dry silica gel 60 and dry decolorizing activated carbon under nitrogen. Volatiles were removed under vacuum. Yield: 170 g, colorless liquid, viscosity 1.6 poise, containing <15% starting monomer (by GC), a dimer as a major component (>50% by weight) and a small amount of trimer (by KIDS mass spectroscopy). The oligomers showed significantly enhanced solids residue vs. the monomer, when small samples were heated for 1 hour at 220° F. Compounds were also made wherein the viscosities in poises were 1.2 and 1.5.

What is claimed is:
1. A film-forming reactive silyl group-containing compound selected from the group consisting of at least one member of the group A and B:

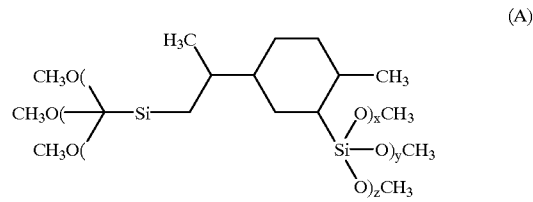

(A)

wherein x, y and z are independently 1 to 3 and at least one of x, y and z is not 1; and (B)

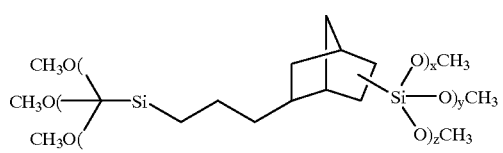

wherein x, y and z are independently 1 to 3 and at least one of x, y and z is not 1.

2. A process for making a film-forming hydrolytically reactive silyl group-containing oligomeric compound suitable for use in a sprayable coating composition comprising the steps:

i) reacting a silane selected from the group consisting of disilylated limonene and disilylated vinylnorbornene with a controlled amount of water at a molar ratio of water/silane group in the range of about 0.10 to about 0.12 in the presence of a catalyst, ii) removing volatiles from the reaction product of (i) to complete oligomerization, and iii) optionally removing (a) insoluble byproducts of step (ii) and (b) inert solvent employed to facilitate removal of insoluble byproducts;

whereby the reactive compound that is formed has at least 4 silyl groups, a number average molecular weight between about 300 and 3000 and wherein during cure no more than about 22.8 parts by weight of silyl group-containing compound per 100 parts of the compound evaporate in 30 minutes at a baking temperature of of 140° C.

3. The process of claim 2 wherein said catalyst is dodecylbenzenesulfonic acid.

* * * * *